US009859567B2

(12) United States Patent
Kitao et al.

(10) Patent No.: US 9,859,567 B2
(45) Date of Patent: Jan. 2, 2018

(54) METHOD AND DEVICE FOR PRODUCING A CATALYST

(71) Applicants: TOYOTA JIDOSHA KABUSHIKI KAISHA, Toyota-shi, Aichi-ken (JP); KOBE STEEL, LTD., Kobe-shi, Hyogo (JP)

(72) Inventors: Noriyuki Kitao, Nagaizumi-cho (JP); Tsugio Fujisawa, Fuji (JP); Akira Matsuoka, Kobe (JP); Koji Noishiki, Takasago (JP); Tomohiro Oozono, Takasago (JP)

(73) Assignees: TOYOTA JIDOSHA KABUSHIKI KAISHA, Toyota (JP); KOBE STEEL, LTD., Kobe (JP)

( * ) Notice: Subject to any disclaimer, the term of this patent is extended or adjusted under 35 U.S.C. 154(b) by 0 days.

(21) Appl. No.: 14/979,292

(22) Filed: Dec. 22, 2015

(65) Prior Publication Data
US 2016/0218370 A1    Jul. 28, 2016

(30) Foreign Application Priority Data
Jan. 22, 2015    (JP) ................................. 2015-010520

(51) Int. Cl.
*B01J 8/04*    (2006.01)
*B01J 23/42*    (2006.01)
(Continued)

(52) U.S. Cl.
CPC ......... *H01M 4/8657* (2013.01); *B01J 8/0457* (2013.01); *B01J 8/0492* (2013.01);
(Continued)

(58) Field of Classification Search
CPC ........ B01J 8/0457; B01J 8/0492; B01J 23/42; B01J 23/44; B01J 23/8926; B01J 19/0093; B01J 19/24; H01M 4/8657; H01M 4/92
See application file for complete search history.

(56) References Cited

U.S. PATENT DOCUMENTS 5,137,607 A * 8/1992 Anderson ........... C02F 1/46104
204/157.15
5,308,454 A * 5/1994 Anderson ........... C02F 1/46104
204/157.15
(Continued)

FOREIGN PATENT DOCUMENTS

JP    2014128756 A    7/2014
JP    2014-204304 A    10/2014
(Continued)

OTHER PUBLICATIONS

Sep. 29, 2017 Office Action issued in U.S. Appl. No. 15/302,006.

*Primary Examiner* — Cam N. Nguyen
(74) *Attorney, Agent, or Firm* — Oliff PLC

(57) ABSTRACT

Disclosed is a method for producing a catalyst, wherein the method comprises: a supplying step of supplying a dispersion containing a palladium-containing fine particle from a supplying part into a reaction container; a preparing step of preparing a copper-palladium-containing complex in which at least part of a surface of the palladium-containing fine particle is covered with copper, by passing the dispersion through a reacting part and bringing the palladium-containing fine particle in the dispersion into contact with a copper-containing member in the reacting part; and a substituting step of substituting the copper in the copper-palladium-containing complex emitted from an emitting part with platinum by bringing the complex into contact with a platinum-containing solution.

15 Claims, 3 Drawing Sheets

(51) Int. Cl.
  *B01J 23/44* (2006.01)
  *B01J 23/89* (2006.01)
  *B01J 19/00* (2006.01)
  *B01J 19/24* (2006.01)
  *H01M 4/86* (2006.01)
  *H01M 4/92* (2006.01)

(52) U.S. Cl.
  CPC ........... *B01J 19/0093* (2013.01); *B01J 19/24* (2013.01); *H01M 4/92* (2013.01); *B01J 2219/00891* (2013.01); *B01J 2219/24* (2013.01)

(56) References Cited

U.S. PATENT DOCUMENTS

| | | | | |
|---|---|---|---|---|
| 7,479,469 | B2* | 1/2009 | Ishihara | B01J 23/40 |
| | | | | 429/483 |
| 8,361,924 | B2* | 1/2013 | Tanaka | B01J 21/18 |
| | | | | 429/400 |
| 9,163,041 | B2* | 10/2015 | Wan | C07F 9/3813 |
| 2010/0177462 | A1 | 7/2010 | Adzic et al. | |
| 2011/0155579 | A1 | 6/2011 | Wang et al. | |
| 2012/0010069 | A1 | 1/2012 | Takehiro et al. | |
| 2012/0046164 | A1* | 2/2012 | Tanaka | B01J 21/18 |
| | | | | 502/319 |
| 2012/0245019 | A1 | 9/2012 | Adzic et al. | |
| 2012/0321996 | A1* | 12/2012 | Ito | H01M 4/8657 |
| | | | | 429/524 |
| 2013/0022899 | A1 | 1/2013 | Arai et al. | |
| 2013/0029842 | A1* | 1/2013 | Kimura | B22F 1/0018 |
| | | | | 502/339 |
| 2013/0324391 | A1 | 12/2013 | Shao | |
| 2014/0106260 | A1* | 4/2014 | Cargnello | B01J 37/0072 |
| | | | | 429/528 |
| 2014/0178575 | A1* | 6/2014 | Iio | H01M 4/92 |
| | | | | 427/115 |
| 2014/0200133 | A1* | 7/2014 | Kimura | B22F 1/0018 |
| | | | | 502/339 |
| 2014/0217328 | A1* | 8/2014 | Daly | B01J 19/0093 |
| | | | | 252/373 |
| 2015/0011655 | A1* | 1/2015 | Jurczakowski | B22F 1/0018 |
| | | | | 514/769 |
| 2015/0318560 | A1 | 11/2015 | Kaneko et al. | |
| 2016/0218372 | A1 | 7/2016 | Nanba | |
| 2016/0260984 | A1 | 9/2016 | Yamada et al. | |
| 2017/0117554 | A1* | 4/2017 | Kitao | H01M 4/8657 |

FOREIGN PATENT DOCUMENTS

| | | |
|---|---|---|
| JP | 2015-047536 A | 3/2015 |
| JP | 2015-077580 A | 4/2015 |
| JP | 2016-073895 A | 5/2016 |
| WO | 2016/051960 A1 | 4/2016 |

* cited by examiner

METHOD AND DEVICE FOR PRODUCING A CATALYST

BACKGROUND OF THE INVENTION

Technical Field

The present invention relates to a method for producing a catalyst, which is configured not to require the application of a potential at the time of covering the surface of a palladium-containing fine particle with copper, in the production of a catalyst. The present invention also relates to a production device which is configured to be able to realize the method.

Background Art

As a technique aimed at cost reduction of catalysts, a technique relating to fine catalyst particles is known, which have a structure that includes a core particle and an outermost layer covering the core particle (a so-called core-shell structure). In the fine catalyst particles, by using a relatively inexpensive material for the core particle, the cost of the inside of the particles which does not participate in catalytic reactions can be reduced. In Patent Literature 1, a technique for covering the surface of a fine catalyst particle with copper is disclosed, in which a reaction container is filled with a carbon-containing member; a raw material for fine catalyst particles is passed through the reaction container, with applying a given potential thereto; and the surface of the fine catalyst particle is covered with copper by copper underpotential deposition (Cu-UPD).

Patent Literature 1: Japanese Patent Application Laid-Open (JP-A) No. 2014-128756

However, in the prior art disclosed in Patent Literature 1, a device for applying a potential to the reaction container is additionally required, which will be the cause of an increase in the production cost, especially in the case of expanding the reaction scale.

BRIEF SUMMARY OF THE INVENTION

The present invention was achieved in light of the above circumstance. An object of the present invention is to provide a method for producing a catalyst, which is configured not to require the application of a potential at the time of covering the surface of a palladium-containing fine particle with copper, in the production of a catalyst. Another object of the present invention is to provide a production device which is configured to be able to realize the method.

The catalyst production method of the present invention is a method for producing a catalyst comprising a fine catalyst particle which comprises a palladium-containing fine particle and a platinum-containing outermost layer covering at least part of the palladium-containing fine particle, wherein a reaction container comprising (1) a supplying part, (2) a reacting part inside which one or more copper-containing members are provided, and (3) an emitting part is used; wherein at least part of a surface of the copper-containing member contains at least one copper-containing material selected from the group consisting of copper, a copper alloy and a copper compound; and wherein the method comprises: a supplying step of supplying a dispersion containing the palladium-containing fine particle from the supplying part into the reaction container; a preparing step of preparing a copper-palladium-containing complex in which at least part of a surface of the palladium-containing fine particle is covered with copper, by passing the dispersion through the reacting part and bringing the palladium-containing fine particle in the dispersion into contact with the copper-containing member in the reacting part; and a substituting step of substituting the copper in the copper-palladium-containing complex emitted from the emitting part with platinum by bringing the complex into contact with a platinum-containing solution.

In the production method of the present invention, the dispersion and an inert gas are preferably supplied from the supplying part into the reaction container.

In the production method of the present invention, at least the reacting part can be a microreactor.

In the production method of the present invention, the dispersion preferably contains the palladium-containing fine particle and an acid solution.

In the production method of the present invention, the catalyst is preferably a catalyst for fuel cells.

The catalyst production device of the present invention is a device for producing a catalyst comprising a fine catalyst particle which comprises a palladium-containing fine particle and a platinum-containing outermost layer covering at least part of the palladium-containing fine particle, wherein the device comprises a reaction container and a reaction vessel; wherein the reaction container comprises: a supplying part for supplying a dispersion containing the palladium-containing fine particle into the reaction container; a reacting part for preparing a copper-palladium-containing complex in which at least part of a surface of the palladium-containing fine particle is covered with copper, by bringing the palladium-containing fine particle in the dispersion supplied from the supplying part into contact with one or more copper-containing members provided inside the reacting part; and an emitting part for emitting the copper-palladium-containing complex to the reaction vessel; wherein at least part of a surface of the copper-containing member contains at least one copper-containing material selected from the group consisting of copper, a copper alloy and a copper compound; and wherein, in the reaction vessel, the copper in the copper-palladium-containing complex emitted from the emitting part is substituted with platinum by bringing the complex into contact with a platinum-containing solution.

In the production device of the present invention, the dispersion and an inert gas are preferably supplied from the supplying part into the reaction container.

In the production device of the present invention, at least the reacting part can be a microreactor.

In the production device of the present invention, the dispersion preferably contains the palladium-containing fine particle and an acid solution.

In the production device of the present invention, the catalyst is preferably a catalyst for fuel cells.

According to the present invention, by passing the dispersion containing the palladium-containing fine particle through the reacting part and bringing the palladium-containing fine particle into contact with the copper-containing member, copper ions eluted from the surface of the copper-containing member can be deposited on the surface of the palladium-containing fine particle, using that the potential at which the copper ions are eluted from the copper-containing member surface (0.38 V vs. RHE) is approximately equal to the potential which is required for copper underpotential deposition (0.38 V vs. RHE). As a result, it is no longer required to apply a potential from the outside, so that the production cost can be reduced than ever before.

The catalyst of the present invention can be used for fuel cells; moreover, it can be as a catalyst for general use.

REFERENCE SIGNS LIST

Figure 1:
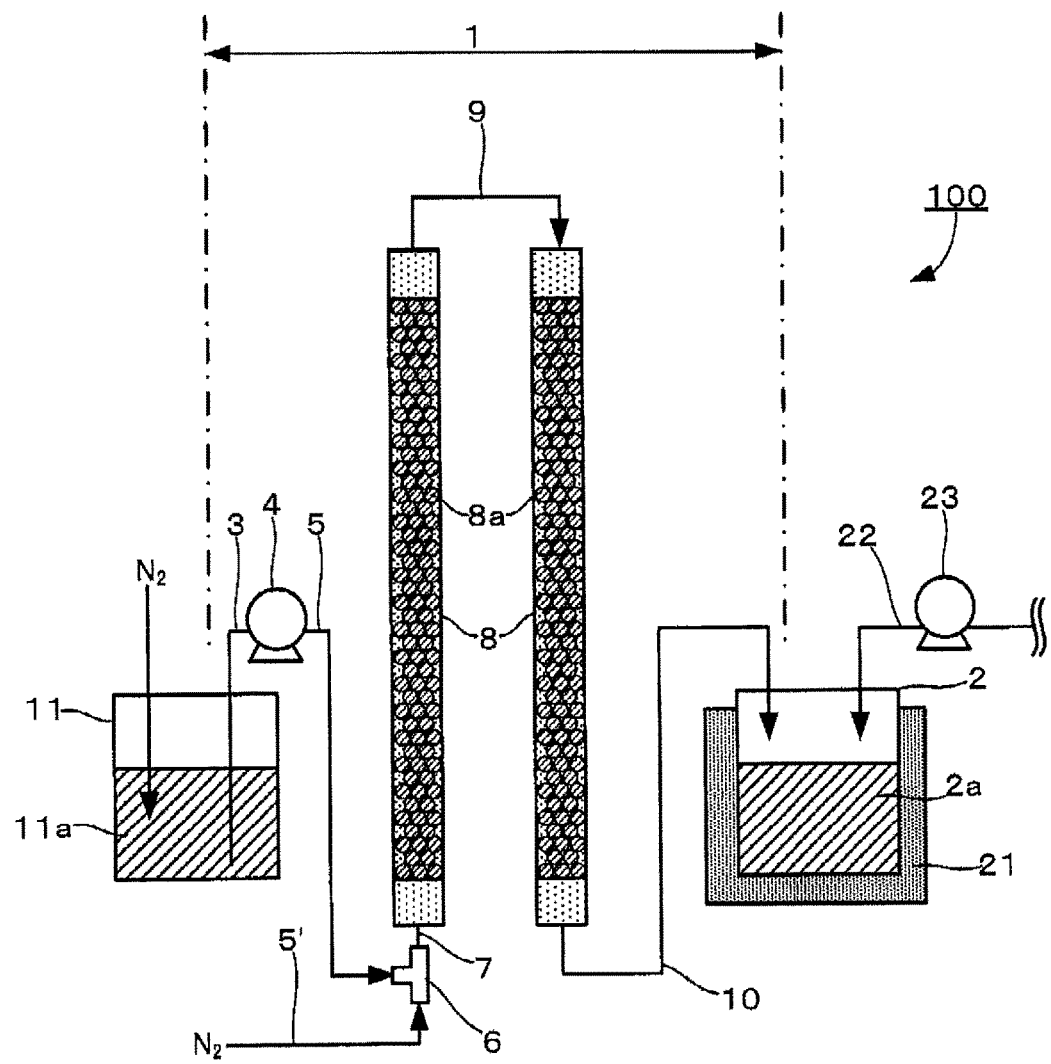
FIG. 1 is a schematic view of an embodiment of the production device according to the present invention.

1. Reaction container
2. Reaction vessel
2a. Dispersion of a reaction mixture
3, 5, 5', 7, 9, 10. Flow channel
4. Plunger pump
6. T-pipe
8. Reactor
8a. Copper ball
11. Container
11a. Dispersion containing a palladium-containing fine particle
21. Ice bath
22. Flow channel
23. Syringe pump
41. Reaction container
42. Working electrode
43. Reaction mixture
100. Embodiment of a production device
400. Production device used in Comparative Example 1

DETAILED DESCRIPTION OF THE INVENTION

1. The Method for Producing a Catalyst

The catalyst produced by the method of the present invention is preferably used as a catalyst for fuel cells. Accordingly, a method for producing a catalyst for fuel cells will be mainly described below. However, the catalyst produced by the method of the present invention encompasses catalysts for general use. In particular, the catalyst produced by the method of the present invention can be used for purposes such as a catalyst for desulfurization, a catalyst for organic chemicals, a catalyst for inorganic chemicals, a catalyst for fine chemicals, a catalyst for biomass production, a catalyst for petroleum refinery, a catalyst for synthetic gas production, a catalyst for hydrogen production, a catalyst for alcohol synthesis, a catalyst for coal liquefaction, etc.

The method for producing a catalyst for fuel cells according to the present invention is a method for producing a catalyst comprising a fine catalyst particle which comprises a palladium-containing fine particle and a platinum-containing outermost layer covering at least part of the palladium-containing fine particle, wherein a reaction container comprising (1) a supplying part, (2) a reacting part inside which one or more copper-containing members are provided, and (3) an emitting part is used; wherein at least part of a surface of the copper-containing member contains at least one copper-containing material selected from the group consisting of copper, a copper alloy and a copper compound; and wherein the method comprises: a supplying step of supplying a dispersion containing the palladium-containing fine particle from the supplying part into the reaction container; a preparing step of preparing a copper-palladium-containing complex in which at least part of a surface of the palladium-containing fine particle is covered with copper, by passing the dispersion through the reacting part and bringing the palladium-containing fine particle in the dispersion into contact with the copper-containing member in the reacting part; and a substituting step of substituting the copper in the copper-palladium-containing complex emitted from the emitting part with platinum by bringing the complex into contact with a platinum-containing solution.

The material for the reaction container used in the present invention is not particularly limited. In the present invention, the reaction container can be or cannot be electroconductive, since no potential is applied from the outside.

As the material contained in the reaction container, for example, there may be mentioned quartz glass; carbonaceous materials including graphite (e.g., black lead, plumbago), amorphous carbon (e.g., carbon black, activated carbon) and amorphous carbon; electroconductive metals such as copper, nickel, platinum, aluminum, iron, silver and gold; and electroconductive non-metals such as titanium oxide ($TiO_2$), ruthenium oxide ($RuO_2$), indium oxide ($In_2O_3$) and tin oxide ($SnO_2$).

The shape of the reaction container is not particularly limited, as long as it efficiently promotes chemical reactions and does not block the flow of a reactant, reaction mixture and/or reaction product from the below-described supplying part to the below-described reacting part and emitting part. As the shape of the reaction container, for example, there may be mentioned a cylindrical shape, a so-called capsule shape in which a hemisphere is attached to each side of a cylinder, an egg shape, a conical shape, a prism shape and a pyramid shape.

The reaction container includes (1) a supplying part, (2) a reacting part and (3) an emitting part. The reaction container is not limited to a container having the three elements only. In addition to the three elements, the reaction container can include other elements such as an inert gas supplying device as described below, for example.

Hereinafter, the elements (1) to (3) and other elements will be described in order.

(1) The Supplying Part

The supplying part used in the present invention is a part that can supply the dispersion containing the palladium-containing fine particle (hereinafter may be referred to as Pd dispersion) into the reaction container.

The supplying part occupies a part of the reaction container, and it is not particularly limited as long as it can continuously supply the Pd dispersion from the outside of the reaction container into the reaction container. As the supplying part, for example, there may be mentioned a supply pipe for supplying the Pd dispersion, a supply outlet for supplying the Pd dispersion, and a storage space for temporarily storing the Pd dispersion just before the reacting part. Of them, the supplying part is preferably the supply pipe for supplying the Pd dispersion into the reaction container.

In the present invention, the palladium-containing fine particle is a general term for a fine palladium particle and a fine palladium alloy particle.

As will be described below, the outermost layer covering the palladium-containing fine particle contains platinum. Platinum is excellent in catalytic activity, especially in oxygen reduction reaction (ORR) activity. While the lattice constant of platinum is 3.92 Å, the lattice constant of palladium is 3.89 Å, and this is a value that is within a range of 5% either side of the lattice constant of platinum. Accordingly, no lattice mismatch occurs between platinum and palladium, and palladium can be sufficiently covered with platinum.

In the present invention, from the viewpoint of cost reduction, it is preferable that the palladium-containing fine particle contains a metal material that is less expensive than the below-described material which is used for the platinum-containing outermost layer. It is more preferable that the palladium-containing fine particle contains a metal material which is electroconductive.

In the present invention, from the above viewpoint, it is preferable that the palladium-containing fine particle is a fine palladium particle or an alloy particle of palladium and a metal such as cobalt, iridium, rhodium or gold. In the case of using a palladium alloy particle, the palladium alloy particle can contain palladium and only one kind of metal or more kinds of metals.

The average particle diameter of the palladium-containing fine particles is not particularly limited, as long as it is equal to or less than the average particle diameter of the below-described fine catalyst particles. From the point of view that the ratio of surface area to cost per palladium-containing fine particle is high, the average particle diameter of the palladium-containing fine particles is preferably 30 nm or less, more preferably 5 to 10 nm.

In the present invention, the average particle diameter of the palladium-containing fine particles and the fine catalyst particles is calculated by a conventional method. An example of the method for calculating the average particle diameter of the palladium-containing fine particles and the fine catalyst particles is as follows. First, the particle diameter of a particle shown in a TEM image at a magnification of 400,000 to 1,000,000× is calculated, given that the particle is spherical. Such a particle diameter calculation by TEM observation is carried out on 200 to 500 particles of the same type, and the thus-obtained average of the particles is regarded as the average particle diameter.

In the case of producing a carbon-supported catalyst in which the fine catalyst particle is supported on a carbon carrier, it is preferable to use the palladium-containing fine particle supported on a carbon carrier in this step. By the use of the carbon carrier, when the carbon-supported catalyst is used in the electrocatalyst layer of a fuel cell, electroconductivity can be imparted to the electrocatalyst layer.

Concrete example of carbonaceous materials that can be used as the carbon carrier include electroconductive carbonaceous materials including carbon particles and carbon fibers, such as Ketjen Black (product name; manufactured by: Ketjen Black International Company), Vulcan (product name; manufactured by: Cabot Corporation), Norit (product name; manufactured by: Norit), Black Pearls (product name; manufactured by: Cabot Corporation), Acetylene Black (product name; manufactured by: Chevron) and OSAB (product name; manufactured by: Denki Kagaku Kogyo Kabushiki Kaisha).

A dispersion medium contained in the Pd dispersion in combination with the palladium-containing fine particle is not particularly limited, as long as it is not a material that can chemically permeate the palladium-containing fine particle. The dispersion medium can be either an organic solvent or an inorganic solvent.

From the point of view that equilibrium between copper metal and copper ion can be readily formed on the palladium-containing fine particle surface, the dispersion medium is preferably an acid solution. The type of the acid solution is not particularly limited, as long as it is such an acidic solution that can elute an appropriate amount of copper. As the acid solution, for example, there may be mentioned a nitric acid aqueous solution, a copper nitrate aqueous solution, a sulfuric acid aqueous solution, a copper sulfate aqueous solution, a perchloric acid aqueous solution, a copper perchlorate aqueous solution, a hydrochloride aqueous solution, a copper hydrochloride aqueous solution, a hypochlorous acid aqueous solution, and a copper hypochlorite aqueous solution. Of them, from the viewpoint of maintaining the equilibrium between copper metal and copper ion, an aqueous solution of a copper salt is particularly preferred, and a copper sulfate aqueous solution is more particularly preferred.

The concentration of the acid solution is preferably $1\times10^{-4}$ mol/L or more and 1 mol/L or less, more preferably $1\times10^{-3}$ or more and $1\times10^{-1}$ mol/L or less.

The solid-liquid concentration of the Pd dispersion is a parameter that relates to copper covering treatment efficiency. The solid-liquid concentration (g/L) of the Pd dispersion is a value that is obtained by dividing the mass (g) of a dispersed solid including the palladium-containing fine particle (preferably palladium-supported carbon) by the volume (L) of the dispersion medium of the Pd dispersion. The solid-liquid concentration of the Pd dispersion is preferably 0.1 g/L or more and 10 g/L or less, more preferably 0.5 g/L or more and 7 g/L or less, still more preferably 1 g/L or more and 4 g/L or less. When the solid-liquid concentration of the Pd dispersion is less than 0.1 g/L, the efficiency of the treatment of covering the palladium-containing fine particle with copper may be reduced. On the other hand, when the solid-liquid concentration of the Pd dispersion is more than 10 g/L, the number of contacts between the palladium-containing fine particle and the copper-containing member decreases and, as a result, the covering with copper may not be finished.

Preferably, the dispersion and an inert gas are supplied from the supplying part into the reaction container. In the case of employing this embodiment, more preferably, the reacting part is a microreactor. This is because a slug flow that is specific to very small spaces can be formed by the Pd dispersion and the inert gas.

In the present invention, the microreactor means a flow-type chemical reaction device in which the inside of a very small space that is several micrometers to several millimeters on a side, serves as a reaction site. By using the very small spaces, the surface area of a reactant per unit volume increases, so that the contact area between reactants increases. Accordingly, mixing and interfacial reactions can be carried out efficiently. Also, the slug flow means a phenomenon that a liquid phase and a gas phase flow alternately in the microreactor, at predetermined very short intervals. Details of the microreactor will be described below.

Due to the occurrence of the slug flow, an internal circulation flow occurs in the Pd dispersion phase and, as a result, the contact frequency between the palladium-containing fine particle and the copper-containing member can be dramatically increased. The increase in the contact frequency leads to an increase in the coverage of the palladium-containing fine particle surface with a copper monatomic layer.

An example that realizes, in a so-called core-shell synthesis method, higher efficiency and a higher-performance catalyst by combining a slug flow that occurs in a microspace with flow synthesis, has not been known yet.

As the inert gas which can be used in the present invention, for example, there may be mentioned a nitrogen gas, an argon gas, etc.

As an example that generates the slug flow, there may be mentioned a case in which, using a three-way pipe such as Y-pipe or T-pipe, the flow of the Pd dispersion and that of the inert gas are allowed to collide with each other, by sending the Pd dispersion from one port of the three-way pipe and sending the inert gas from the other port. What is important at this time is the collision angle of the two flows. When the collision angle is 180°, no slug flow may occur. The collision angle of the Pd dispersion flow and the inert gas flow is preferably more than 0° and less than 180°, more preferably 30° or more and 120° or less, still more preferably 60° or more and 90° or less.

The flow rate of the inert gas is a parameter that relates to the average residence time of the palladium-containing fine particles in the reacting part. The flow rate of the inert gas is preferably 0.1 mL/min or more and 6 mL/min or less, more preferably 1 mL/min or more and 5 mL/min or less, still more preferably 2 mL/min or more and 4 mL/min or less, depending on the reaction scale. When the flow rate of the inert gas is less than 0.1 mL/min, the inert gas is not sufficiently supplied to the reacting part, so that the effect created by the slug flow may not be sufficient. On the other hand, when the flow rate of the inert gas is more than 6 mL/min, the average residence time of the palladium-containing fine particles is shortened and may cause a decrease in Cu-UPD reaction rate (that is, copper covering treatment efficiency).

The ratio of the flow rate of the inert gas and that of the Pd dispersion is a parameter that relates to the volume ratio of the gas phase and the liquid phase which are alternately placed in the flow direction of the slug flow. When the ratio of the inert gas flow rate to the Pd dispersion flow rate is too small, the gas phase is turned into bubbles being smaller than the diameter of the flow channel and cannot occupy the section of the flow channel, so that the slug flow cannot be formed. On the other hand, even when the ratio of the inert gas flow rate to the Pd dispersion flaw rate is too large, the slug flow cannot be formed due to the same reason. When the inert gas flow rate increases, the average residence time of the palladium-containing fine particles is shortened and may cause a decrease in Cu-UPD reaction rate. Also, the flow rate of the inert gas is preferably equal to or less than the flow rate of the Pd dispersion. Accordingly, the ratio of the inert gas flow rate to that of the Pd dispersion flow rate is preferably 0.05 or more and 1 or less, more preferably 0.2 or more and 0.8 or less, still more preferably 0.3 or more and 0.7 or less, depending on the reaction scale.

(2) The Reacting Part

The reacting part used in the present invention is a part inside which one or more copper-containing members are provided.

More specifically, the reacting part of the reaction container is a space in the reaction container, which is other than the above-described supplying part and the below-described emitting part, and it is a part that actually contributes to the covering reaction of the palladium-containing fine particle with copper. As will be described below, considering that the copper covering reaction is initiated by the contact between the palladium-containing fine particle and the copper-containing member, the reacting part can be defined as a contact area between the palladium-containing fine particle and the copper-containing member. However, in the present invention, the whole reaction container part in which the copper-containing member is present, can be regarded as the reacting part.

The reacting part can include a part connecting the reactors, such as the below-described flow channel 9. How- ever, the descriptions of the inner diameter of the reacting part provided below are not always true for the connecting part. Also, the length of the below-described reacting part is a length that does not include the connecting part.

The shape of the reacting part is preferably a cylindrical shape, from the viewpoint of passing the Pd dispersion therethrough. The reacting part is mainly defined by the inner diameter and length thereof.

From the viewpoint of making the Pd dispersion flow rate constant, the inner diameter of the reacting part is preferably constant. When the reacting part has a cylindrical shape, the inner diameter of the reacting part means the diameter of a circle that is inscribed in a section which is perpendicular to the height direction of the cylinder. The inner diameter of the reacting part is not particularly limited and is needed to be a length that can sufficiently secure the average residence time of the palladium-containing fine particles. The inner diameter of the reacting part is preferably 500 μm or more and 10 cm or less, more preferably 1 mm or more and 7 cm or less, still more preferably 3 mm or more and 5 cm or less, depending on the reaction scale.

In the case of using the above-described microreactor, the inner diameter of the microreactor is preferably 500 μm or more and 10 mm or less, more preferably 1 mm or more and 7 mm or less, still more preferably 3 mm or more and 5 mm or less. When the inner diameter of the microreactor is less than 500 μm, the Pd dispersion processing amount per hour may be insufficient. When the inner diameter of the microreactor is more than 10 mm, no slug flow may occur.

The length of the reacting part is a parameter that mainly relates to the average residence time of the palladium-containing fine particles. When the reacting part is long, the reaction of covering the palladium-containing fine particle with copper sufficiently proceeds. However, the reaction time and the size of the reaction container also increase and, as a result, the cost of the device may increase. On the other hand, when the reacting part is short, the reaction time can be reduced. However, the average residence time of the palladium-containing fine particles is insufficient, and the copper covering reaction may not sufficiently proceed. By appropriately increasing or decreasing the length of the reacting part, the average residence time of the palladium-containing fine particles can be controlled. To decrease the length of the reacting part, a more efficient production method that uses the above slug flow can be also used.

The length of the reacting part is preferably 300 mm or more and 10,000 mm or less, more preferably 500 mm or more and 5,000 mm or less, still more preferably 1,000 mm or more and 2,000 mm or less, depending on the reaction scale. When the length of the reacting part is less than 300 mm, the average residence time of the palladium-containing fine particles cannot be sufficiently secured, and the amount of copper deposited on the surface of the palladium-containing fine particle may be too small. When the length of the reacting part is more than 10,000 mm, the reaction time is too long and may result in poor production efficiency.

To increase the reaction scale, a reacting part with a larger inner diameter can be used. Or, two or more reacting parts can be connected in parallel and used for the copper covering reaction in parallel. Especially, in the case of the microreactor, the inner diameter is limited, so that scale-up can be easy by connecting two or mote microreactor in parallel and used for the reaction.

The copper-containing member used in the reacting part is a member in which at least part of the surface of the member contains at least one copper-containing material selected from the group consisting of copper, a copper alloy and a copper compound. The copper-containing member is required to function to generate copper ions when it coexists with the Pd dispersion. More specifically, it is required that when the copper-containing member and the Pd dispersion are brought into contact with each other, a chemical equilibrium occurs between the copper-containing material and copper ions ($Cu^{2+}$) in the contact area.

In the present invention, the copper-containing member functions to cover the palladium-containing fine particle with a copper monatomic layer. When the copper-containing member is exposed to the Pd dispersion, the equilibrium reaction between the copper and copper ions moves on to copper ion production and, as a result, copper ions are eluted into the Pd dispersion. As just described, the elution potential at which copper becomes copper ions (0.38 V vs. RHE) is approximately equal to the Cu-UPD potential generated on the palladium-containing fine particle surface (0.38 V vs. RHE). Accordingly, the eluted copper ions are reduced immediately after they are in contact with the palladium-containing fine particle in the Pd dispersion. As a result, a copper monatomic layer is formed on the palladium-containing fine particle surface. That is, the present invention is an invention that uses, at the time when copper and the Pd dispersion coexist, the elution potential of copper as a copper deposition potential in Cu-UPD. No further Cu-UPD occurs even if copper ions are brought into contact with the surface of the copper monatomic layer, so that there is no possibility that two or more copper atomic layers are deposited on the palladium-containing fine particle surface in the present invention. As a result, unnecessary copper consumption can be prevented.

In the copper alloy, a metal other than copper is preferably one that has a higher standard electrode potential $E^0$ than the elution potential of copper (0.38 V vs. RHE). When the standard electrode potential $E^0$ is lower than the elution potential of copper, metal ions other than copper is eluted into the Pd dispersion and may inhibit the palladium-containing fine particle from being covered with copper. From this viewpoint, preferred copper alloys include a copper-iron alloy, a copper-silver alloy, a copper-platinum alloy and a copper-gold alloy, for example.

As the copper compound, for example, there may be mentioned copper oxides such as copper(II) oxide (CuO) and copper(I) oxide ($Cu_2O$); copper hydroxides such as copper(II) hydroxide ($Cu(OH)_2$) and copper(I) hydroxide (CuOH); copper carbonates such as copper(II) carbonate ($CuCO_3$); copper carbo-sulfides such as copper(II) sulfide (CuS) and copper(I) sulfide ($Cu_2S$); and copper sulfates such as copper(II) sulfate ($CuSO_4$) and copper(I) sulfate ($Cu_2SO_4$). Of them, copper oxides are preferred, and copper (II) oxide is more preferred.

Of the metallic copper, copper alloy and copper compound, the metallic copper is more preferred.

Preferably, the whole surface of the copper-containing member contains the copper-containing material. The copper-containing member can be composed of a copper-containing material only, or it can have a so-called layered structure in which a core contains a material other than copper and has a copper-containing material on the surface thereof. In the case of the copper-containing member having the layered structure, materials that can be used as the core are not particularly limited, and there may be mentioned inorganic materials such as ceramic and organic materials such as polymer, for example. As the method for forming the layered structure, for example, there may be mentioned a method for plating a core particle containing ceramic, etc., with copper.

The shape of the copper-containing member is not particularly limited, as long as it is a shape that can ensure a wide contact area with the palladium-containing fine particle for the copper covering reaction. As the shape of the copper-containing member, for example, there may be mentioned a particle shape, a pipe shape, and a shape that can ensure a flow channel for passing reactants and so on through the copper-containing member.

Of these shapes, the copper-containing member is preferably in a particle shape, from the point of view that the copper-containing member can be evenly brought in contact with the palladium-containing fine particle and the palladium-containing fine particle covered with copper can smoothly flow out to the emitting part. As the shape of the particle, for example, there may be mentioned a ball shape, an ellipsoidal shape, a polyhedral shape, an irregular shape and a cylindrical shape. Preferred is a ball shape, from the point of view that the surface area is the largest with respect to a fixed volume.

Considering the above comprehensively, the copper-containing member is more preferably copper balls.

Depending on the reaction scale, the copper-containing member is required to have a size that is equal to or larger than a predetermined size. When the copper-containing member has a very fine shape, the filling rate of the reacting part with the copper-containing member is too high and may result in a much increase in pressure loss of the Pd dispersion, or copper ions are excessively eluted and may result in a failure to retain the shape of the copper-containing member.

The size of the copper-containing member can be defined by the inner diameter of the reacting part, for example. When the copper-containing member is in a particle shape and, for example, the inner diameter of the reacting part is in millimeters, it is preferable that the diameter of the copper-containing member is also in millimeters. When the inner diameter of the reacting part is in micrometers, it is preferable that the diameter of the copper-containing member is also in micrometers. As used herein, the "diameter of the copper-containing member" means the longest diameter of the diameters of the copper-containing member.

For example, when the inner diameter of the reacting part is 1 mm or more and 10 mm or less, the diameter of the copper-containing member is preferably 0.1 mm or more and equal to or less than the inner diameter of the reacting part.

From the viewpoint of sufficiently ensuring an opportunity for contact with the palladium-containing fine particle, it is preferable that the Copper-containing member is present inside the reacting part, at an appropriate density. When the copper-containing member is in a particle shape, the filling rate of the copper-containing member is preferably 30 to 99% by volume, more preferably 40 to 80% by volume.

Due to the above principle, the covering of the palladium-containing fine particle with copper progresses and, as a result, the thus-obtained copper-palladium-containing complex has a higher coverage with copper than ever before. Also, due to the above principle, it is not required to apply a potential to the reaction container from the outside; therefore, the production cost can be reduced than ever before, and the size of the whole production device can be decreased.

(3) The Emitting Part

The emitting part used in the present invention is a part for emitting the copper-palladium-containing complex produced by the above-described copper covering reaction to the outside of the reaction container (preferably to a reaction vessel).

The emitting part occupies a part of the reaction container, and it is not particularly limited as long as it can smoothly emit the copper-palladium-containing complex from the inside of the reaction container to the outside thereof. As the emitting part, for example, there may be mentioned an outlet pipe for emitting the copper-palladium-containing complex, an outlet for emitting the copper-palladium-containing complex, and a storing space for temporarily storing the copper-palladium-containing complex. The emitting part is preferably connected to a reaction vessel as described below (a vessel for bringing the copper-palladium-containing complex into contact with the platinum-containing solution).

(4) Other Elements

In the present invention, it is preferable to install a device for supplying the inert gas from the supplying part. Using this device, effects are produced with the generation of the slug flow, and the Pd dispersion can be stirred by the inert gas; moreover, the flow rate of the Pd dispersion can be controlled.

As the inert gas supplying device, for example, there may be mentioned an inert gas supplying pipe connected to an inert gas supply source outside the reaction container. The inert gas supplying device can be connected to the above-described three-way pipe in the supplying part or can be installed as a bubbler in a container for storing the Pd dispersion which will serve as a raw material or in the reaction vessel.

The present invention includes (a) a Pd dispersion supplying step, (b) a copper-palladium-containing complex preparing step, and (c) a substituting step. The present invention is not limited to the three steps. In addition to the three steps, it can include a filtering/washing step, drying step, pulverizing step as described below, for example.

Hereinafter, the steps (a) to (c) and other steps will be described in order.

(a) The Pd Dispersion Supplying Step

This is a step of supplying the Pd dispersion from the supplying part into the reaction container.

It is preferable to deoxidize the Pd dispersion in advance by bubbling an inert gas thereinto. To enter a uniformly-dispersed state, the Pd dispersion is preferably stirred and mixed in advance by applying a shear force with a homogenizer, etc. Either the deoxidation by bubbling or the mixing and stirring by the shear force can be carried our first, or they can be carried out several times, alternately.

The flow rate of the Pd dispersion is a parameter that relates to the average residence time of the palladium-containing fine particles in the reacting part. The flow rate of the Pd dispersion is preferably 1 mL/min or more and 15 mL/min or less, more preferably 3 mL/min or more and 12 mL/min or less, still more preferably 6 mL/min or more and 8 mL/min or less, depending on the reaction scale. Since the reaction volume is constant, there is an inverse relationship between the flow rate of the Pd dispersion and the average residence time of the palladium-containing fine particles. When the flow rate of the Pd dispersion is less than 1 mL/min, the average residence time of the palladium-containing fine particles increases; however, the copper covering treatment efficiency may deteriorate. On the other hand, when the flow rate of the Pd dispersion is more than 15 mL/min, due to the shortage of the average residence time, the copper covering treatment may not be finished.

To keep the flow rate of the Pd dispersion constant, the Pd dispersion can be supplied using a plunger pump.

The average residence time of the Pd dispersion is a parameter that relates to the progress of the copper covering reaction. The average residence time $t_1$ (min) of the Pd dispersion in the case where the inert gas is not supplied from the supplying part, can be obtained by the following formula (I):

$$t_1 = [\{V \times \{1-(\epsilon/100)\}\}/v_1] \quad \text{Formula (I)}$$

wherein V is the volume (mL) of a part filled with the copper-containing member in the reacting part; $\epsilon$ is the filling rate (% by volume) of the copper-containing member; and $v_1$ is a flow rate (mL/min) of the Pd dispersion.

As used herein, the "part filled with the copper-containing member" means a part where, in the reacting part, the copper-containing member is actually retained, and it means that for the convenience of space, it does not include a part and so on which is not filled with the copper-containing member at both ends of the reacting part, for example.

The average resistance time $t_2$ of the Pd dispersion in the case where the inert gas is supplied from the supplying part, can be obtained by the following formula (II):

$$t_2 = [\{V \times \{1-(\epsilon/100)\}\}/(v_1+v_2)] \quad \text{Formula (II)}$$

wherein $v_2$ is the flow rate (mL/min) of the inert gas, and V, $\epsilon$ and $v_1$ are the same as the formula (I).

The average residence time of the Pd dispersion is preferably 10 seconds or more and 300 seconds or less, more preferably 60 seconds or less, more preferably 15 seconds or more and 40 seconds or less, and still more preferably 23 seconds or more and 30 seconds or less, depending on the reaction scale. When the average resistance time of the Pd dispersion is less than 10 seconds, due to the shortage of the average resistance time, the copper covering treatment may not be finished.

The copper covering treatment time is a time from the start of the emission of a reaction mixture from the emitting part to the end of the emission of the reaction mixture from the emitting part. For example, in the case of using a palladium-supported carbon (Pd/C), the copper covering treatment time per gram of the Pd/C is preferably 10 minutes or more and 60 minutes or less, more preferably 20 minutes or more and 50 minutes or less, still more preferably 40 minutes or more and 47 minutes or less, depending on the reaction scale. When the copper covering treatment time is more than 60 minutes, the copper covering treatment efficiency may deteriorate.

(b) the Copper-palladium-containing Complex Preparing Step

This is a step of preparing the copper-palladium-containing complex in which at least part of the surface of the palladium-containing fine particle is covered with copper, by passing the Pd dispersion through the reacting part and bringing the palladium-containing fine particle in the Pd dispersion into contact with the copper-containing member in the reacting part.

The effects produced by the copper-containing member are as described above.

In this step, the progress of the copper covering reaction can be confirmed by measuring the potential of the reaction mixture that has passed through the reacting part. Details are as follows.

First, the reaction mixture emitted from the emitting part is collected in a container. A working electrode, a counter electrode and a reference electrode are immersed in the reaction mixture and connected to a tester to measure the potential. At this time, when the measured potential is equal to or more than the elution potential of copper (0.38 V vs.

RHE) and is equal to or less than the elution potential of palladium (0.91 V vs. RHE), it can be evaluated that palladium and copper are mixed and present on the surface of the copper-palladium-containing complex, and it can be determined that Cu-UPD is not sufficiently promoted yet. On the other hand, when the measured potential is approximately equal to the elution potential of copper (0.38 V vs. RHE), it can be evaluated that the surface of the copper-palladium-containing complex is almost covered with a copper monatomic layer, so that the completion of Cu-UPD is confirmed.

As just described, in the present invention, production efficiency can be evaluated by the time required to pass through the reacting part; moreover, the degree of progress of the covering of the palladium-containing fine particle surface with copper can be evaluated by the potential of the reaction mixture that has passed through the reacting part.

(c) The Substituting Step

This is a step of substituting the copper in the copper-palladium-containing complex emitted from the emitting part with platinum by bringing the complex into contact with a platinum-containing solution.

The copper-palladium-containing complex emitted from the reaction container is turned into a fine catalyst particle by substituting the copper monatomic layer with an outermost layer containing platinum.

The platinum-containing solution can be prepared by appropriately dissolving a platinum compound such as $K_2PtCl_4$ in an acid such as sulfuric acid. The concentration of the acid, which is a solvent, is not particularly limited. For example, it is 0.05 M. It is preferable to bubble an inert gas such as nitrogen into the platinum-containing solution, in advance. To surely substitute copper atoms with platinum atoms, it is also preferable to decrease the rate of the substitution reaction of copper with platinum.

To decrease the substitution reaction rate, for example, there may be mentioned a method for cooling a reaction vessel which is used to promote the substitution reaction. To cool the reaction vessel, for example, an ice bath can be used. The temperature of the reaction vessel is preferably 0° C. or more and 10° C. or less.

The reaction mixture containing the copper-palladium-containing complex is mixed with the platinum-containing solution. By this operation, the copper monatomic layer on the surface of the palladium-containing fine particle can be substituted with the platinum monatomic layer.

The substitution plating time is about 10 minutes to 10 hours, depending on the amount of a sample.

The method for mixing the reaction mixture containing the copper-palladium-containing complex with the platinum-containing solution is not particularly limited. For example, the reaction mixture and the platinum-containing solution can be mixed by connecting the emitting part of the reaction container to a reaction vessel containing the platinum-containing solution and then automatically transferring the reaction mixture emitted from the reaction container to the reaction vessel. Also, the reaction mixture and the platinum-containing solution can be mixed in the reaction vessel by connecting a reaction vessel to the emitting part and then further connecting a container containing the platinum-containing solution to the reaction vessel. In the case of using this embodiment, it is preferable to add the platinum-containing solution in the reaction vessel in a dropwise manner, at a fixed flow rate, using a syringe pump, etc.

The progress of the substitution reaction can be confirmed by measuring the potential of the reaction mixture at the completion of the substitution reaction. The method for measuring the potential is the same as the above-described potential measuring method in the copper covering reaction. When the powder potential of the reaction mixture is in a range of 0.6 V (vs. RHE) or more and 0.8 V (vs. RHE) or less, it can be evaluated that the copper monatomic layer on the copper-palladium-containing complex surface is absolutely substituted with platinum, so that the completion of the substitution reaction is confirmed.

The outermost layer contains platinum. Platinum is excellent in catalytic activity, especially in oxygen reduction reaction activity. As described above, no lattice mismatch occurs between the palladium-containing fine particle and the outermost layer, and the palladium-containing fine particle can be sufficiently covered with platinum.

In addition to platinum, iridium, ruthenium, rhodium or gold can be contained in the outermost layer. In the case of using a platinum alloy for the outermost layer, the platinum alloy can contain platinum and only one kind of metal, or it can contain platinum and two or more kinds of metals.

From the point of view that the elution of the palladium-containing fine particle can be more inhibited, the coverage of the palladium-containing fine particle with the outermost layer is preferably 0.8 to 1. When the coverage is less than 0.8, the palladium-containing fine particle is eluted in an electrochemical reaction and, as a result, the catalyst may deteriorate.

As used herein, the "coverage of the palladium-containing fine particle with the outermost layer" means the ratio of the area of the palladium-containing fine particle covered with the outermost layer given that the total surface area of the palladium-containing fine particle is 1. An example of the method for calculating the coverage will be described below. First, the outermost layer metal content (A) of the fine catalyst particle is measured by inductively coupled plasma mass spectrometry (ICP-MS), etc. Meanwhile, the average particle diameter of the fine catalyst particles is measured by a transmission electron microscope (TEM), etc. From the average particle diameter thus measured, the number of atoms on the surface of a particle having the same diameter is estimated, and the outermost layer metal content (B) in the case where one atomic layer on the particle surface is substituted with the metal contained in the outermost layer, is estimated. The value obtained by dividing the outermost layer metal content (A) by the outermost layer metal content (B) is the "coverage of the palladium-containing fine particle with the outermost layer".

The outermost layer covering the palladium-containing fine particle is preferably a monatomic layer. The fine catalyst particle having such a structure is advantageous in that compared to a fine catalyst particle having an outermost layer that is composed of two or more atomic layers, the catalytic performance of the outermost layer is much higher and, since the amount of the outermost layer covering the palladium-containing fine particle is small, the material cost is lower.

The lower limit of the average particle diameter of the fine catalyst particles is preferably 4 nm or more, more preferably 5 nm or more. The upper limit is preferably 40 nm or less, more preferably 10 nm or less.

Filtering, washing, drying, etc., of the fine catalyst particle can be carried out after the metal layer is substituted with the outermost layer.

The filtering and washing of the fine catalyst particle is not particularly limited, as long as they are carried out by a method that can remove impurities without any damage to the covered structure of the fine catalyst particle thus produced. As the filtering and washing, for example, there may be mentioned a method for carrying out filtration under reduced pressure using water, perchloric acid, dilute sulfuric acid, dilute nitric acid, etc.

The drying of the fine catalyst particle is not particularly limited, as long as it is carried out by a method that can remove solvents, etc. As the drying, for example, there may be mentioned a method for carrying out vacuum drying under a temperature condition of 60 to 80° C. for 1 to 20 hours.

2. Device for Producing a Catalyst

The catalyst produced by the production device of the present invention is preferably used as a catalyst for fuel cells. Accordingly, a device for producing a catalyst for fuel cells will be mainly described below. However, the catalyst produced by the production device of the present invention encompasses catalysts for general use. Also, the catalyst produced by the production device of the present invention can be used for other purposes described above, in addition to the use as a catalyst for fuel cells.

The device for producing a catalyst for fuel cells according to the present invention is a device for producing a catalyst comprising a fine catalyst particle which comprises a palladium-containing fine particle and a platinum-containing outermost layer covering at least part of the palladium-containing fine particle, wherein the device comprises a reaction container and a reaction vessel; wherein the reaction container comprises: a supplying part for supplying a dispersion containing the palladium-containing fine particle into the reaction container; a reacting part for preparing a copper-palladium-containing complex in which at least part of a surface of the palladium-containing fine particle is covered with copper, by bringing the palladium-containing fine particle in the dispersion supplied from the supplying part into contact with one or more copper-containing members provided inside the reacting part; and an emitting part for emitting the copper-palladium-containing complex to the reaction vessel; wherein at least part of a surface of the copper-containing member contains at least one copper-containing material selected from the group consisting of copper, a copper alloy and a copper compound; and wherein, in the reaction vessel, the copper in the copper-palladium-containing complex emitted from the emitting part is substituted with platinum by bringing the complex into contact with a platinum-containing solution.

The production device of the present invention is a device that is suitable for carrying out the production method of the present invention.

The reaction container in the production device of the present invention is the same as the reaction container used in the above-described production method of the present invention. That is, the supplying part, reacting part and emitting part in the production device of the present invention are the same as the supplying part, reacting part and emitting part of the reaction container used in the above-described production method of the present invention. Accordingly, the functions of the supplying part and reacting part of the production device of the present invention correspond to the above-described Pd dispersion supplying step (a) and copper-palladium-containing complex preparing step (b), respectively. Also, the function of the emitting part and reaction vessel of the production device of the present invention corresponds to the above-described substituting step (c).

Hereinafter, with reference to FIG. 1, an embodiment 100 of the production device of the present invention will be described. To show the internal structures in detail, the sections of the elements of the production device are shown in FIG. 1. Curved arrows shown in FIG. 1 indicate the flow channels of the Pd dispersion or the reaction mixture. The directions indicated by the arrows indicate the flow directions of the Pd dispersion and the reaction mixture. A double wavy line shown in FIG. 1 means that FIG. 1 is partially omitted.

As shown in FIG. 1, the embodiment 100 includes a reaction container 1 and a reaction vessel 2. In FIG. 1, the reaction container 1 is a part starting from the starting end of a flow channel 3 to the end of a flow channel 10, through two reactors 8.

The supplying part in the reaction container 1 include the flow channel 3 a plunger pump 4, a flow channel 5, a T-pipe 6 and a flow channel 7. When a flow channel 5' is used, the supplying part can include the flow channel 5'. The functions of the plunger pump 4 and the T-pipe 6 are as described above.

The reacting part in the reaction container 1 includes the two reactors 8 and a flow channel 9 that connects the two reactors. The reactors 8 are thin pipes that are filled with copper balls 8a. The number of the copper balls 8a can be appropriately controlled, depending on a request for the size or filling rate of the reaction container. For example, the number of the copper balls can be 10 to 10,000. The number of the reactors 8 is not limited to two. As described above, to earn the average resistance time of the palladium-containing fine particles, three or more reactors 8 can be connected in series. For scale up, a plurality of reactors 8 can be connected in parallel.

The emitting part in the reaction container 1 corresponds to the flow channel 10 shown in FIG. 1. The flow channel 10 can be appropriately extended or shortened so that the reaction mixture emitted from the reactors 8 stays in the reaction vessel 2.

A Pd dispersion 11a, which is a raw material, is added in a container 11. The starting end of the flow channel 3 is installed so as to be sufficiently immersed in the Pd dispersion 11a.

The reaction vessel 2 is installed in a constant temperature bath so that the content is kept at a predetermined temperature. As described above, it is preferable to carry out the substituting step under a low temperature condition of 0° C. or more and 10° C. or less. Accordingly, it is preferable to use an ice bath 21 as the constant temperature bath.

A thermometer and electrodes (a reference electrode, a counter electrode and a working electrode), which are not shown in FIG. 1, are installed inside the reaction vessel 2, so that the temperature and potential of the content in the reaction vessel 2 can be measured. Also, the platinum-containing solution can be added in a dropwise manner in the reaction vessel 2, from a container (not shown) containing the platinum-containing solution through a syringe pump 23, a flow channel 22 and so on. By adding the platinum-containing solution in a dropwise manner in a reaction mixture 2a containing the copper-palladium-containing complex, the opportunity for contact of the copper-palladium-containing complex with the platinum-containing solution can be sufficiently ensured. The reaction vessel 2 can include a stirring device such as a stirrer.

Hereinafter, a typical example of the catalyst production using the embodiment 100 will be described.

First, as a preliminary step, a copper sulfate aqueous solution is added in the container 11, and nitrogen is bubbled into the aqueous solution, thereby deoxidizing the copper sulfate aqueous solution. Next, using the plunger pump 4, the copper sulfate aqueous solution is supplied to the reactors 8 to substitute the inside of the reactors 8 by the copper sulfate aqueous solution.

A raw material containing the palladium-containing fine particle (preferably palladium-supported carbon) is suspended in the copper sulfate aqueous solution and stirred. The mixture is added in the container 11. Nitrogen is bubbled into the container 11, thereby deoxidizing the Pd dispersion (preferably the dispersion of the palladium-supported carbon). The solid-liquid concentration of the Pd dispersion thus obtained is set to 0.1 g/L or more and 10 g/L or less.

Using the ice bath 21, the temperature of the reaction vessel 2 is controlled to 0° C. or more and 10° C. or less. The inside of the reaction vessel 2, which is empty, is substituted with nitrogen for deoxidation. Also, nitrogen was bubbled into the platinum-containing solution, thereby deoxidizing the platinum-containing solution.

Next, a catalyst is produced.

The plunger pump 4 is operated to send the Pd dispersion 11a into the reactors 8 through the flow channel 3, the flow channel 5, the T-pipe 6 and the flow channel 7. As needed, nitrogen is sent into the reactors 8 from the flow channel 5' connected to the T-pipe 6, at a flow rate of 0.1 mL/min or more and 6 mL/min or less, thereby forming a slug flow inside the reactors 8. The flow rate of the Pd dispersion 11a is set to 1 mL/min or more and 15 mL/min or less. The palladium-containing fine particle in the Pd dispersion 11a is brought into contact with the copper balls 8a in the reactors 8, thereby forming a copper monatomic layer on the palladium-containing fine particle surface. The thus-obtained reaction mixture is transferred to the reaction vessel 2 through the flow channel 10. The average residence time of the Pd dispersion lie calculated by the formula (I) or (II) is 10 seconds or more and 300 seconds or less. The time from the start of the emission of the reaction mixture from the flow channel 10 to the end of the emission of the reaction mixture from the flow channel 10 (copper covering treatment time) is 10 minutes or more and 60 minutes or less per gram of the Pd/C, for example.

After a certain period of time, a tester is connected to the electrodes installed in the reaction vessel 2, and the potential of the dispersion 2a in the reaction vessel 2 is measured to confirm the completion of the copper covering reaction. After the potential measurement, the syringe pump 23 is operated to add a predetermined amount of the platinum-containing solution in the reaction vessel 2 in a dropwise manner, through the flow channel 22. After the completion of the addition, the potential of the dispersion 2a is measured to confirm the completion of the platinum substitution reaction.

Thereafter, the thus-obtained reaction mixture is filtered, washed and dried, thereby obtaining the catalyst.

In this typical example, by the use of the embodiment 100 of the production device, not only a decrease in process cost can be achieved, but also a high-quality catalyst can be produced for a shorter time than ever before. Also, because the reactors 8 which are filled with the copper balls 8a are used and it is not necessary to apply a potential from the outside, there are advantages such that the module configuration is simple and the equipment investment is small.

EXAMPLE

Hereinafter, the present invention will be described in detail, by way of examples and comparative examples. However, the scope of the present invention is not limited to these examples.

1. Production of a catalyst for fuel cells

Example 1

1-1. Preparation of Production Device

First, as shown in FIG. 1, a production device 100 including reactors 8 was assembled. Flow channels 3, 5 and 7, a plunger pump 4 and a T-pipe 6 were installed between a container and the reactors 8 (the supplying part). By the piping arrangement shown in FIG. 1, a dispersion was allowed to be supplied from one port (a flow channel 5) of the T-pipe 6 to the reactors 8; however, the other port (a flow channel 5') of the T-pipe 6 was closed.

The reactors 8 are thin pipes which are filled with a plurality of copper balls 8a. Details of the reactors 8 used in Example 1 are as follows.

Material for the reactors: glass
Total length of the reactors (excluding a flow channel 9): 1,000 mm
Inner diameter of the reactors: 3.0 mm
Number of the connected reactors: 2
Mass of the filled copper balls: 33 g
Diameter of the copper balls: 1 mm
Length of the copper-filled parts of the reactors: 945 mm Since the specific gravity of copper is 8.9 g/cm$^3$, from the above data, the filling rate of the copper balls was obtained as follows:

Filling rate of the copper balls =

(the total volume of the copper balls)/

(the volume of the copper-filled parts of the reactors) =

$\{(33/8.9)\ (cm^3)\}/\{945 \times (\pi r^2)\}$ =

$\{3.7\ (cm^3)\}/\{945 \times 3.14 \times (1.5)^2)\}$ =

$\{3.7\ (cm^3)\}/\{6676\ (mm^3)\}$ = 55% by volume

As shown FIG. 1, the two reactors 8 were connected by the flow channel 9 (the reacting part).

A flow channel 10 was extended from the dispersion flow direction end of the reactors 8 (the emitting part) so that the dispersion emitted from the reactors 8 stayed in a reaction vessel 2. The reaction vessel 2 was installed so as to be sufficiently immersed in an ice bath 21, and the temperature was maintained so that the content in the reaction vessel 2 was kept at 3° C. A thermometer and electrodes (a reference electrode, a counter electrode and a working electrode), which are not shown in FIG. 1, were installed inside the reaction vessel 2 so that the temperature and potential of the content in the reaction vessel 2 could be measured. In addition, a platinum-containing solution was allowed to be added in a dropwise manner in the reaction vessel 2, through a syringe pump 23 and a flow channel 22.

1-2. Preparation for Catalyst Production

First, a 0.05 mol/L copper sulfate aqueous solution was added in the container 11, and nitrogen was bubbled into the aqueous solution at a flow rate of 50 mL/min, thereby deoxidizing the copper sulfate aqueous solution. Next, using the plunger pump 4, the 0.05 mol/L copper sulfate aqueous solution was supplied to the reactors 8 to substitute the inside of the reactors 8 by the copper sulfate aqueous solution.

A palladium-supported carbon (hereinafter may be referred to as Pd/C), which is a raw material, was suspended in the 0.05 mol/L copper sulfate aqueous solution. The thus-obtained Pd/C suspension was mixed under the following conditions to disperse the Pd/C in the suspension.

Mixing device: ultrasonic oscillator (model: UH-300; manufactured by: SMT Co., Ltd.)
Mixing temperature: normal temperature (15 to 30° C.)
Mixing time: 15 minutes The thus-obtained Pd/C dispersion was added in the container 11. Nitrogen was bubbled thereinto for 10 minutes or more, thereby deoxidizing the Pd/C dispersion. The solid-liquid concentration of the Pd/C dispersion was set to 4 g/L.

The reaction vessel 2 was cooled in the ice bath. The inside of the reaction vessel 2, which was empty, was substituted with nitrogen for deoxidation. By the above preliminary preparation, the part starting from the container 11 to the reaction vessel 2 through the reactors 8, was placed under a nitrogen atmosphere.

Also, $K_2PtCl_4$ was dissolved in 0.05 mol/L sulfuric acid to prepare a platinum-containing solution.

Nitrogen was bubbled into the thus-obtained platinum-containing solution, thereby deoxidizing the platinum-containing solution.

1-3. Production of a Catalyst for Fuel Cells

The plunger pump 4 was operated to send the Pd/C dispersion 11a into the reactors 8. The flow rate of the Pd/C dispersion 11a was set to 6 mL/min. The average residence time of the Pd/C dispersion 11a calculated by the formula (I) was 30 seconds. The time from the start of the emission of the reaction mixture from the flow channel 10 to the end of the emission of the reaction mixture from the flow channel 10 (copper covering treatment time) was 42 minutes per gram of the Pd/C.

After a certain period of time, a tester was connected to the electrodes installed in the reaction vessel 2, and the potential of the dispersion 2a in the reaction vessel 2 was measured. The result was 0.42 V (vs. RHE). This indicates that inside the reactors 8, the palladium fine particle in the Pd/C dispersion was brought into contact with the copper balls and, as a result, copper was deposited on almost all of the palladium fine particle surface.

After the potential measurement, the syringe pump 23 was operated to add a predetermined amount of the platinum-containing solution in the reaction vessel 2 in a dropwise manner. After the addition, the potential of the dispersion 2a was monitored, and it was confirmed that the powder potential converged in a range of 0.6 to 0.8 V (vs. RHE). Because of this, it was confirmed that all of the copper on the palladium fine particle surface was substituted with platinum.

1-3. Post-treatment

The reaction mixture in the reaction vessel 2 was filtered using a reduced pressure filtration device, and the resulting product was washed with ultrapure water.

The washed resulting product was dried in a vacuum drier at 60° C. for 10 hours or more, thereby obtaining the catalyst for fuel cells of Example 1.

Example 2

In "1-1. Preparation of production device" in Example 1, two new reactors 8 were further added to double the total length of the reactors. Details of the reactors 8 used in Example 2 are as follows.

Material for the reactors: glass
Total length of the reactors (excluding the flow channel 9): 2,000 mm
Inner diameter of the reactors: 3.0 mm
Number of the connected reactors: 4
Mass of the filler copper balls: 66 g
Diameter of the copper balls: 1 mm
Length of the copper-filled parts of the reactors: 1,890 mm
Filling rate of the copper balls: 55% by volume The time from the start of the emission of the reaction mixture from the flow channel 10 to the end of the emission of the reaction mixture from flow channel 10 (copper covering treatment time) was 47 minutes per gram of the Pd/C.

Then, the preparation of the production device, the preparation of the catalyst production, the production of the catalyst, and the post-treatment were carried out in the same manner as Example 1, thereby obtaining the catalyst for fuel cells of Example 2.

Example 3

In Example 3, "1-1. Preparation of production device" and "1-2. Preparation for catalyst production" were carried out in the same manner as Example 1. In "1-1. Preparation of production device", by the piping arrangement as shown in FIG. 1, the dispersion was allowed to be supplied from one port (the flow channel 5) of the T-pipe 6 to the reactors 8, and nitrogen was allowed to be supplied from the other port (the flow channel 5') of the T-pipe 6 to the reactors 8.

Next, the plunger pump 4 was operated to send the Pd/C dispersion 11a from one port (the flow channel 5) of the T-pipe 6 into the reactors 8, at a flow rate of 6 mL/min. From the other port (the flow channel 5') of the T-pipe 6, nitrogen gas was sent into the reactors 8 at a flow rate of 2 mL/min. As shown in FIG. 1, the angle between the flow direction of the Pd/C dispersion 11a and the flow direction of the nitrogen was set to 90°. As just described, by supplying the Pd/C dispersion 11a and the nitrogen gas into the reactors 8 from the flow channel 7, a slug flow was formed inside the reactors 8. The average residence time of the Pd/C dispersion 11a calculated by the formula (II) was 23 seconds. The time from the start of the emission of the reaction mixture from the flow channel 10 to the end of the emission of the reaction mixture from the flow channel 10 (copper covering treatment time) was 45 minutes per gram of the Pd/C.

After a certain period of time, a tester was connected to the electrodes installed in the reaction vessel 2, and the potential of the dispersion 2a in the reaction vessel 2 was measured. The result was 0.38 V (vs. RHE). This indicates that inside the reactors 8, the palladium fine particle in the Pd/C dispersion was brought into contact with the copper balls and, as a result, copper was deposited on the whole palladium fine particle surface.

Thereafter, the platinum substitution and the post-treatment were carried out in the same manner as Example 1, thereby obtaining the catalyst for fuel cells of Example 3.

Example 4

The catalyst for fuel cells of Example 4 was obtained in the same manner as Example 3, except that the flow rate of the nitrogen gas supplied to the reactors 8 was changed from 2 mL/min to 4 mL/min.

Example 5

The catalyst for fuel cells of Example 5 was obtained in the same manner as Example 3, except that the solid-liquid concentration of the Pd/C dispersion, which was a raw material, was changed from 4 g/L to 1 g/L.

Example 6

The catalyst for fuel cells of Example 6 was obtained in the same manner as Example 3, except that the flow rate of the Pd/C dispersion 11a supplied to the reactors 8 was changed from 6 mL/min to 12 mL/min.

Comparative Example 1

Figure 5:
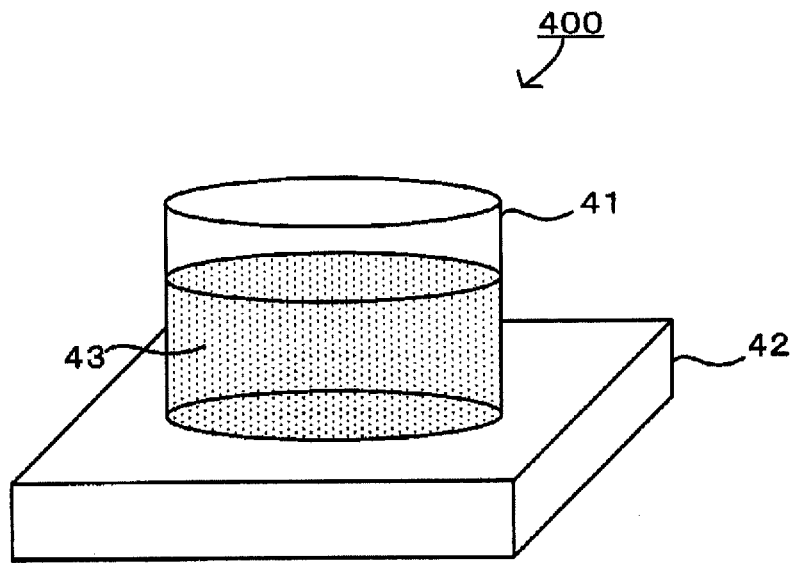
FIG. 5 is a schematic perspective view of a production device 400 used in Comparative Example 1.

First, Cu-UPD was carried out on a palladium particle. FIG. 5 is a schematic perspective view of a production device 400 used in Comparative Example 1. The production device 400 includes a reaction container 41 (a cylindrical container made of carbon) and a working electrode 42.

In the production device 400, the reaction container 41 and the working electrode 42 are electrically conductive to each other. To the working electrode 42, a potentiostat or the like (not shown) was connected as a potential control device to control the potential of the reaction container 41.

First, by the potential control device, the potential of the reaction container 41 was kept at 0.4 V (vs RHE). Next, a mixture 43 of 10 g of Pd/C and 1.3 L of a copper(II) sulfate ($CuSO_4$) aqueous solution was added in the reaction container 41.

With keeping the potential at 0.4 V (vs RHE), a copper monatomic layer was formed on the palladium particle surface by electrolytic plating (Cu-UPD). The reaction was finished when the copper covering reaction reached equilibrium and the reaction current became almost 0. The copper covering treatment time was 180 minutes per gram of the Pd/C.

$K_2PtCl_4$ was dissolved in 0.05 M sulfuric acid to prepare a platinum-containing solution. Nitrogen was bubbled into the platinum-containing solution in advance.

With appropriately stirring the reaction mixture in the reaction container 41, the platinum-containing solution thus prepared was gradually added in the reaction container 41. By this operation, the copper monatomic layer on the palladium particle surface was substituted with a platinum monatomic layer. The steps from the start of the Cu-UPD to the formation of the platinum monatomic layer were carried out with bubbling nitrogen into the reaction mixture in the reaction container 41.

By filtering the reaction mixture, a catalyst for fuel cells which was composed of a fine catalyst particle, in which the palladium particle surface was covered with the platinum monatomic layer, and a carbon carrier, on which the fine catalyst particle was supported, was obtained. Thereafter, about 4 L of pure water at normal temperature (15 to 30° C.) was added to the catalyst for fuel cells in 10 batches. The mixture was filtered every time the pure water was added, thereby washing the catalyst.

The washed catalyst for fuel cells was dried for 12 hours under a temperature condition of 60° C. The dried catalyst for fuel cells was appropriately pulverized with an agate mortar and a pestle, thereby producing the catalyst for fuel cells of Comparative Example 1.

2. Measurement of Electrochemical Surface Area and Mass Activity

The catalysts for fuel cells of Examples 1 to 3 and Comparative Example 1 were measured for mass activity, by a rotating disk electrode (RDE) method.

Figure 2:
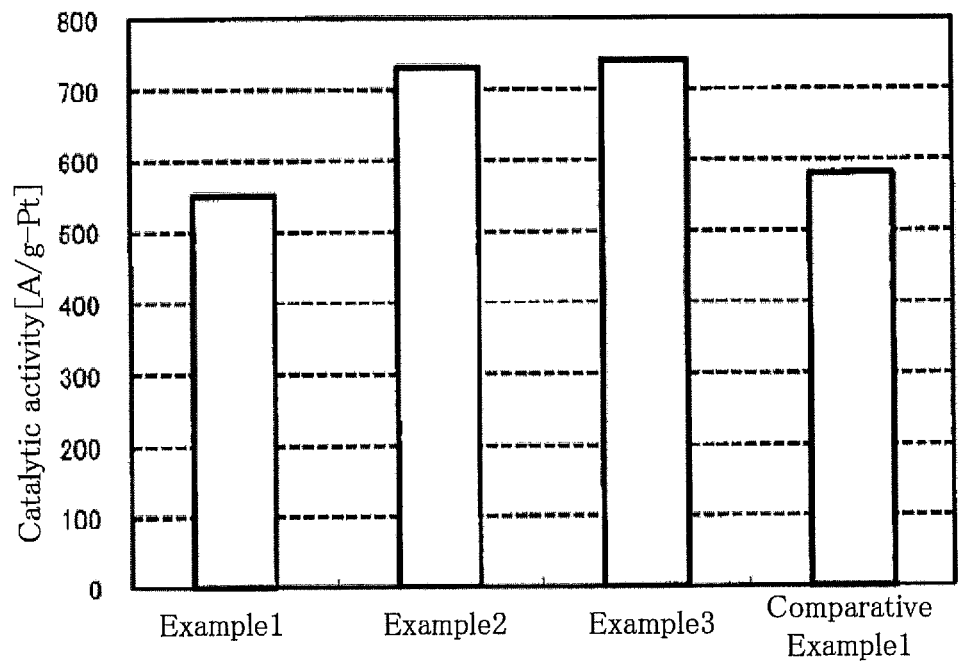
FIG. 2 is a bar graph comparing the catalytic activities (A/g-Pt) of the catalysts of Examples 1 to 3 and Comparative Example 1.
Figure 3:
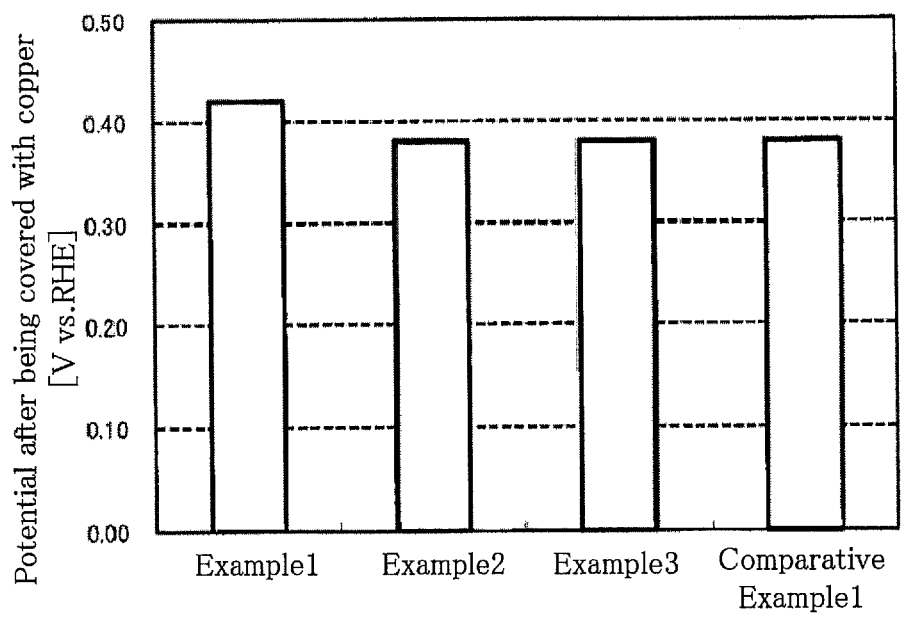
FIG. 3 is a bar graph comparing the potentials (V vs. RHE) of Examples 1 to 3 and Comparative Example 1 after being covered with copper.
Figure 4:
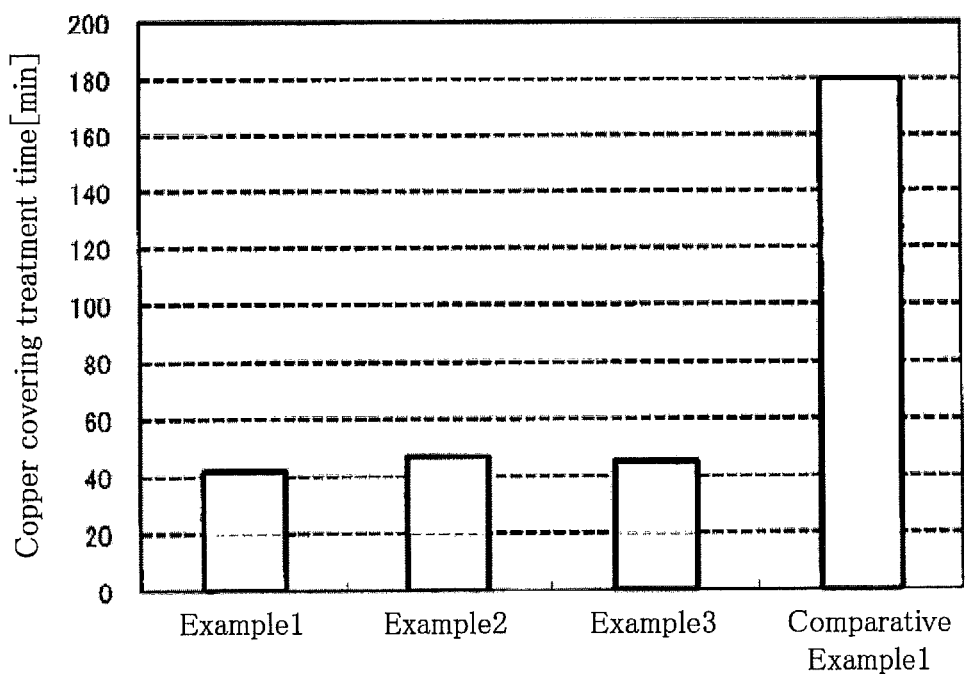
FIG. 4 is a bar graph comparing the copper covering treatment times (min) of Examples 1 to 3 and Comparative Example 1.

FIG. 2 is a bar graph comparing the catalytic activities (A/g-Pt) of the catalysts for fuel cells of Examples 1 to 3 and Comparative Example 1. FIG. 3 is a bar graph comparing the potentials (V vs. RHE) of Examples 1 to 3 and Comparative Example 1 after being covered with copper. FIG. 4 is a bar graph comparing the copper covering treatment times (min) of Examples 1 to 3 and Comparative Example 1.

As is clear from FIG. 2, while the catalytic activity of the Comparative Example 1 is 580 Å/g-Pt, the catalytic activity of Example 1 is 550 Å/g-Pt. Therefore, it is clear that Example 1 can obtain the catalytic activity which is the same level as Comparative Example 1. This result is also clear from FIG. 3 showing that the potential of Example 1 and that of Comparative Example 1 are both about 0.4 V (vs. RHE) after being covered with copper, and almost all of the palladium fine particle surface is covered with copper at the time of passing through the reactors 8.

As is clear from FIG. 4, while the copper covering treatment required 180 minutes in Comparative Example 1, the copper covering treatment finished in 42 minutes in Example 1. In view of this, it has been proven that the production method of the present invention can produce the catalyst for fuel cells which is the same level as conventional catalysts, in one-fourth of the time. Comparative Example 1 requires more production costs since the potential is applied from the outside. In Example 1, however, no potential is applied, so that the catalyst for fuel cells which is low-cost and high-quality can be provided.

As is clear from FIG. 2, the catalytic activity of Example 3 is 740 A/g-Pt. Therefore, it is clear that Example 3 can obtain the catalytic activity which is 1.3 times higher than Comparative Example 1. As is clear from FIG. 3, the potential of Example 3 is 0.38 V (vs. RHE) after being covered with copper, and this potential is equal to the completion potential of the Cu-UPD. Therefore, it has been also proven that at the time of passing through the reactors 8, the whole palladium fine particle surface is covered with copper. As is clear from FIG. 4, while the copper covering treatment required 180 minutes in Comparative Example 1, the copper covering treatment finished in 45 minutes in Example 3. In view of this, it is clear that by using the slug flow, the production method of the present invention can produce the catalyst for fuel cells which is more highly active than conventional catalysts, in one-fourth of the time.

In addition, as is clear from FIG. 2, the catalytic activity of Example 2 is 730 A/g-Pt. As is clear from FIG. 3, the potential of Example 2 is 0.38 V (vs. RHE) after being covered with copper. The catalytic activity of Example 2 and the potential thereof after being covered with copper are approximately the same as Example 3. Therefore, it is clear that by extending the reactors 8, the effects which are the same level as the case of using the slug flow can be obtained. As is clear from FIG. 4, the copper covering treatment time is 47 minutes in Example 2, and the difference with the copper covering treatment time in Example 1 is only 5 minutes. Therefore, it is considered that the effect resulting from doubling the length of the reactors on the reaction time is small.

Table 1 shows the conditions, the copper covering treatment times and the potentials after being covered with copper of the production devices of Examples 1 to 6. Table 1 also shows the results determined by comprehensively evaluating the production efficiencies and the activities of the thus-obtained catalysts for fuel cells. The copper covering treatment time is a criterion for production efficiency evaluation, and the potential after being covered with platinum is a criterion for catalytic activity evaluation. The criteria for comprehensive evaluation in Table 1 are as follows.

○: Production efficiency is high, and the thus-obtained catalyst for fuel cells is highly active.

Δ: Production efficiency is high; however, the thus-obtained catalyst for fuel cells is the same level as conventional catalysts.

×: Production efficiency is low, and the thus-obtained catalyst for fuel cells is less active than conventional catalysts.

TABLE 1

|  | Example 1 | Example 2 | Example 3 | Example 4 | Example 5 | Example 6 |
|---|---|---|---|---|---|---|
| Length of reactors (mm) | 1000 | 2000 | 1000 | 1000 | 1000 | 1000 |
| Solid-liquid concentration of Pd/C dispersion (g/L) | 4 | 4 | 4 | 4 | 1 | 4 |
| Flow rate of Pd/C dispersion (mL/min) | 6 | 6 | 6 | 6 | 6 | 12 |
| Flow rate of nitrogen gas (mL/min) | 0 | 0 | 2 | 4 | 2 | 2 |
| Copper covering treatment time (min) | 42 | 47 | 45 | 45 | 90 | 45 |
| Potential after being covered with copper (V vs. RHE) | 0.42 | 0.38 | 0.38 | 0.38 | 0.38 | 0.45 |
| Comprehensive evaluation | ○ | ○ | ○ | ○ | ○ | Δ |

Hereinafter, Examples 3 and 4 to 6 will be compared. These examples are examples in which nitrogen was supplied to the reactors 8 and the slug flow was used for the Cu-UPD.

It is clear from Table 1 that compared to Example 3, there is no influence on production efficiency and catalytic activity, even though the flow rate of the nitrogen gas was doubled (Example 4). It is considered that the flow rate of the nitrogen gas is a parameter that relates to the average residence time of the Pd/C. However, the results of Example 4 indicate that even if the average residence time of the Pd/C is shorter than Example 3, the highly-active catalyst for fuel cells can be obtained with high efficiency.

It is also clear from Table 1 that compared to Example 3, even though the solid-liquid concentration of the Pd/C dispersion is one fourth (Example 5), the copper covering treatment time per gram of the Pd/C is only half of Comparative Example 1 (180 minutes) and there in no influence on catalytic activity. From this result, it is considered that the solid-liquid concentration of the Pd/C dispersion is a parameter that relates to the copper covering treatment efficiency.

It is also clear from Table 1 that compared to Example 3, even though the flow rate of the Pd/C dispersion is doubled (Example 6), the catalytic activity is the same level as conventional catalysts; however, there is no influence on at least production efficiency. From this result, it is considered that the flow rate of the Pd/C dispersion is a parameter that also relates to the activity of the catalyst for fuel cells thus obtained.

The invention claimed is:

1. A method for producing a catalyst comprising a fine catalyst particle which comprises a palladium-containing fine particle and a platinum-containing outermost layer covering at least part of the palladium-containing fine particle,
    wherein a reaction container comprising (1) a supplying part, (2) a reacting part inside which one or more copper-containing members are provided, and (3) an emitting part is used;
    wherein at least part of a surface of the one or more copper-containing members contains at least one copper-containing material selected from the group consisting of copper, a copper alloy and a copper compound; and wherein the method comprises:
    supplying a dispersion containing the palladium-containing fine particle from the outside of the reaction container into the reaction container;
    preparing a copper-palladium-containing complex in which at least part of a surface of the palladium-containing fine particle is covered with copper, by passing the dispersion through the reacting part and bringing the palladium-containing fine particle in the dispersion into contact with the copper-containing member in the reacting part; and
    substituting the copper in the copper-palladium-containing complex emitted from the emitting part with platinum by bringing the complex into contact with a platinum-containing solution.

2. The method for producing the catalyst according to claim 1, wherein the dispersion and an inert gas are supplied from the outside of the reaction container into the reaction container.

3. The method for producing the catalyst according to claim 2, wherein at least the reacting part is a microreactor.

4. The method for producing the catalyst according to claim 1, wherein the dispersion contains the palladium-containing fine particle and an acid solution.

5. The method for producing the catalyst according to claim 1, wherein the catalyst is a catalyst for fuel cells.

6. A device for producing a catalyst comprising a fine catalyst particle which comprises a palladium-containing fine particle and a platinum-containing outermost layer covering at least part of the palladium-containing fine particle,
    wherein the device comprises a reaction container and a reaction vessel;
    wherein the reaction container comprises:
        a supplying part for supplying a dispersion containing the palladium-containing fine particle into the reaction container;
        a reacting part for preparing a copper-palladium-containing complex in which at least part of a surface of the palladium-containing fine particle is covered with copper, by bringing the palladium-containing fine particle in the dispersion supplied from the supplying part into contact with one or more copper-containing members provided inside the reacting part; and
        an emitting part for emitting the copper-palladium-containing complex to the reaction vessel;

wherein at least part of a surface of the one or more copper-containing members contains at least one copper-containing material selected from the group consisting of copper, a copper alloy and a copper compound; and wherein, in the reaction vessel, the copper in the copper-palladium-containing complex emitted from the emitting part is substituted with platinum by bringing the complex into contact with a platinum-containing solution.

7. The device for producing the catalyst according to claim 6, wherein the dispersion and an inert gas are supplied from the supplying part into the reaction container.

8. The device for producing the catalyst according to claim 7, wherein at least the reacting part is a microreactor.

9. The device for producing the catalyst according to claim 6, wherein the dispersion contains the palladium-containing fine particle and an acid solution.

10. The device for producing the catalyst according to claim 6, wherein the catalyst is a catalyst for fuel cells.

11. A method for producing a catalyst comprising a fine catalyst particle which comprises a palladium-containing fine particle and a platinum-containing outermost layer covering at least part of the palladium-containing fine particle, wherein a reaction container comprising (1) a supplying part, (2) a reacting part inside which one or more copper-containing members are provided, and (3) an emitting part is used;

wherein at least part of a surface of the one or more copper-containing members contains at least one copper-containing material selected from the group consisting of copper, a copper alloy and a copper compound; and wherein the method comprises:

supplying a dispersion containing the palladium-containing fine particle from the outside of the reaction container into the reaction container;

preparing a copper-palladium-containing complex in which at least part of a surface of the palladium-containing fine particle is covered with copper, by passing the dispersion through the reacting part and bringing the palladium-containing fine particle in the dispersion into contact with the copper-containing member in the reacting part; and substituting the copper in the copper-palladium-containing complex emitted from the emitting part with platinum by bringing the complex into contact with a platinum-containing solution; wherein the method is performed without applying a potential from the outside.

12. The method for producing the catalyst according to claim 11, wherein the dispersion and an inert gas are supplied from the outside of the reaction container into the reaction container.

13. The method for producing the catalyst according to claim 12, wherein at least the reacting part is a microreactor.

14. The method for producing the catalyst according to claim 11, wherein the dispersion contains the palladium-containing fine particle and an acid solution.

15. The method for producing the catalyst according to claim 11, wherein the catalyst is a catalyst for fuel cells.

* * * * *